United States Patent
Jargowsky et al.

(10) Patent No.: US 12,233,681 B2
(45) Date of Patent: Feb. 25, 2025

(54) SERRATION EMBEDMENT IN COUPLING ASSEMBLY OF A BUSHING OF AN AUTOMOTIVE SUSPENSION LINK

(71) Applicant: FORD GLOBAL TECHNOLOGIES, LLC, Dearborn, MI (US)

(72) Inventors: Peter Joseph Jargowsky, Canton, MI (US); Grant Warr, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/138,243

(22) Filed: Apr. 24, 2023

(65) Prior Publication Data
US 2024/0351387 A1    Oct. 24, 2024

(51) Int. Cl.
| | | |
|---|---|---|
| B60G 7/00 | (2006.01) | |
| B60G 3/06 | (2006.01) | |
| F16F 1/38 | (2006.01) | |

(52) U.S. Cl.
CPC .............. B60G 7/008 (2013.01); B60G 3/06 (2013.01); F16F 1/38 (2013.01)

(58) Field of Classification Search
CPC ...... B60G 7/008; B60G 3/06; B60G 2204/41; B60G 2204/148; F16F 1/38; F16B 43/00; Y10S 411/957
See application file for complete search history.

(56) References Cited

U.S. PATENT DOCUMENTS

| | | | | |
|---|---|---|---|---|
| 1,427,807 A | * | 9/1922 | Halbleib | F16B 39/282 411/176 |
| 3,006,672 A | * | 10/1961 | Bajer | F16F 1/38 29/525 |
| 3,531,850 A | * | 10/1970 | Durand | F16B 2/005 29/525.04 |
| 3,572,677 A | * | 3/1971 | Damon | F16F 1/3863 267/281 |
| 4,002,327 A | * | 1/1977 | Damon | F16F 1/387 267/281 |
| 4,103,725 A | * | 8/1978 | Abe | F16B 39/24 411/957 |
| 4,202,564 A | * | 5/1980 | Strader | B60G 5/04 280/678 |
| 4,267,896 A | * | 5/1981 | Hendriksen | B60G 9/003 267/66 |

(Continued)

FOREIGN PATENT DOCUMENTS

| | | |
|---|---|---|
| CN | 106671716 A | 5/2017 |
| CN | 208376462 U | 1/2019 |

(Continued)

*Primary Examiner* — Timothy Wilhelm
(74) *Attorney, Agent, or Firm* — Burr & Forman LLP; Lorne Forsythe (57) ABSTRACT

A vehicle suspension link may include a bushing, a knuckle, a link arm operably coupled to the knuckle via the bushing at a ring formed at one end of the link arm, and a coupling assembly comprising a first bushing ferrule on a first axial end of the bushing and a second bushing ferrule on a second axial end of the bushing. Each of the first and second bushing ferrules may include a serrated face disposed to face away from the bushing, the serrated face comprising serrations for embedding into adjacent components.

18 Claims, 5 Drawing Sheets

(56) References Cited

U.S. PATENT DOCUMENTS

| | | | | |
|---|---|---|---|---|
| 4,387,781 A * | 6/1983 | Ezell | ........................ | B60K 25/10 180/65.265 |
| 4,570,969 A * | 2/1986 | Tsutsumi | ................. | B60G 3/26 280/124.152 |
| 4,595,216 A * | 6/1986 | Ware | ....................... | B62D 17/00 280/678 |
| 4,736,964 A * | 4/1988 | Specktor | .................. | B60G 7/02 280/86.753 |
| 5,016,903 A * | 5/1991 | Kijima | ...................... | F16F 1/38 403/228 |
| 5,044,659 A * | 9/1991 | Specktor | ................. | B62D 17/00 280/86.753 |
| 5,116,075 A * | 5/1992 | Pierce | .................... | B60G 9/003 280/124.1 |
| 5,129,669 A * | 7/1992 | Specktor | ................. | B60G 11/28 280/86.753 |
| 5,163,699 A * | 11/1992 | Specktor | ................. | B62D 17/00 280/86.753 |
| 5,193,787 A * | 3/1993 | Coopland, Jr. | ............ | F16F 1/38 403/162 |
| 5,216,811 A * | 6/1993 | Jackson | ................... | B60G 7/02 72/368 |
| 5,503,376 A * | 4/1996 | Simuttis | .................. | F16F 13/28 267/141.5 |
| 5,820,115 A * | 10/1998 | Stevenson | ............. | F16C 27/063 267/293 |
| 6,247,689 B1 * | 6/2001 | Haesle | ..................... | F16F 1/28 267/260 |
| 6,692,179 B2 * | 2/2004 | Bohne | ................. | F16C 11/0614 403/140 |
| 6,945,547 B2 * | 9/2005 | Ackley | .................... | B60G 7/02 280/124.153 |
| 7,077,411 B2 * | 7/2006 | Peters | .................... | B60G 11/28 280/124.132 |
| 7,198,445 B2 * | 4/2007 | Kramer | .................. | F16B 39/24 411/161 |
| 7,306,418 B2 * | 12/2007 | Kornblum | ............. | F16B 35/065 411/957 |
| 7,325,820 B2 * | 2/2008 | Allen | ...................... | B60G 7/008 280/124.152 |
| 7,331,588 B2 * | 2/2008 | Johnson | .................. | B60G 9/00 280/86.754 |
| 7,506,862 B2 * | 3/2009 | Siemer | ..................... | B60G 7/02 267/293 |
| 8,267,416 B2 * | 9/2012 | Allen | ...................... | B60G 3/20 280/124.135 |
| 8,465,010 B2 * | 6/2013 | Kuki | ....................... | F16F 1/3863 267/293 |
| 8,492,004 B2 * | 7/2013 | Watanabe | ............... | F16B 43/00 428/609 |
| 8,579,510 B2 * | 11/2013 | Noble | ................... | F16F 1/3842 384/129 |
| 8,622,406 B2 * | 1/2014 | Eveley | .................... | B60G 7/02 280/124.121 |
| 9,315,222 B1 * | 4/2016 | Wetter | ..................... | B60G 9/02 |
| 9,416,682 B2 * | 8/2016 | Ruberte Sanchez | ...... | F02K 3/10 |
| 10,088,009 B2 * | 10/2018 | Nydam | ................... | B62D 24/02 |
| 10,155,424 B1 * | 12/2018 | Elterman | ............... | B60G 7/001 |
| 10,315,696 B2 * | 6/2019 | Gordon | .................. | B62D 7/166 |
| 10,626,915 B2 * | 4/2020 | Byrnes, Jr. | ............ | F16C 11/045 |
| 10,899,186 B2 * | 1/2021 | Mleczko | ................ | B60G 7/008 |
| 11,608,855 B2 * | 3/2023 | Harleman | ............. | F16C 41/008 |
| 2004/0201193 A1 | 10/2004 | Larson et al. | | |
| 2007/0102894 A1 * | 5/2007 | Derisi | .................... | B60G 7/008 280/86.751 |
| 2013/0187320 A1 * | 7/2013 | Henselmeyer | ......... | A63B 53/14 267/292 |
| 2016/0377117 A1 * | 12/2016 | Powder | .................. | F16C 33/74 384/220 |
| 2019/0178282 A1 * | 6/2019 | Davis | .................... | F16B 39/282 |
| 2022/0235844 A1 * | 7/2022 | Baek | ......................... | F16F 9/54 |
| 2024/0151288 A1 * | 5/2024 | Bixler | .................. | F16F 1/3821 |

FOREIGN PATENT DOCUMENTS

| | | |
|---|---|---|
| JP | 853100527 A | 9/1978 |
| KR | 20100134951 A | 12/2010 |
| KR | 102074646 B1 | 2/2020 |

\* cited by examiner

SERRATION EMBEDMENT IN COUPLING ASSEMBLY OF A BUSHING OF AN AUTOMOTIVE SUSPENSION LINK

TECHNICAL FIELD

Example embodiments generally relate to vehicle suspension and, more particularly, relate to a suspension system that employs serration embedment into a coupling assembly of a bushing of a suspension link to provide better joint tightness.

BACKGROUND

Vehicles commonly employ different types of suspension based on planned usage and performance goals. Accordingly, given that certain vehicle types made by different manufacturers compete with each other in the marketplace, trends can develop whereby certain vehicle types tend to coalesce around using the same types of suspension.

That being said, manufacturers may explore market differentiation avenues by employing a different suspension (or different other features) from time to time. Meanwhile, reducing part count and complexity without sacrificing performance often remains a motivating influence on suspension designs. In the presence of these motivations, some suspension designs have recently included suspension links that are symmetrical with identical rings joined to a rod at opposite ends thereof. Since the link is symmetrical, an installer may have up to four possible ways to install the bushing with its corresponding washers/ferrules.

To prevent selection of the wrong way among possible options by the assembler, there are perhaps several approaches that could be taken. One option may be to design the system so that each possible orientation among the selectable options for the assembly cannot possibly be the wrong way by designing parts to be installable in any orientation. However, this approach may have follow-on effects on other parts that must be considered. The present disclosure addresses this approach.

BRIEF SUMMARY OF SOME EXAMPLES

In accordance with an example embodiment, a vehicle suspension link may be provided. The vehicle suspension link may include a bushing, a knuckle, a link arm operably coupled to the knuckle via the bushing at a ring formed at one end of the link arm, and a coupling assembly comprising a first bushing ferrule on a first axial end of the bushing and a second bushing ferrule on a second axial end of the bushing. Each of the first and second bushing ferrules may include a serrated face disposed to face away from the bushing, the serrated face comprising serrations embedded therein.

In another example embodiment, a vehicle suspension system may be provided. The vehicle suspension system may include a frame comprising one or more lateral or longitudinal frame members, a knuckle operably coupled to the frame, and a vehicle suspension link operably coupling the knuckle to the frame. The vehicle suspension link may include a bushing, a link arm operably coupled to the knuckle via the bushing at a ring formed at one end of the link arm, and a coupling assembly including a first bushing ferrule on a first axial end of the bushing and a second bushing ferrule on a second axial end of the bushing. Each of the first and second bushing ferrules may include a serrated face disposed to face away from the bushing, the serrated face comprising serrations embedded therein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, a symmetrical link may, while increasing simplicity with respect to part design and manufacture, decrease the simplicity of assembly since there may be ambiguity as to how to assemble the part with respect to washers that are to be employed for such assembly. This can be noteworthy when the washers and/or fasteners of the assembly are structured in a way that is intended to provide advantage when oriented in a particular way, as will be discussed in greater detail below. First, however, it is important to appreciate the context in which example embodiments may operate.

Figure 1:
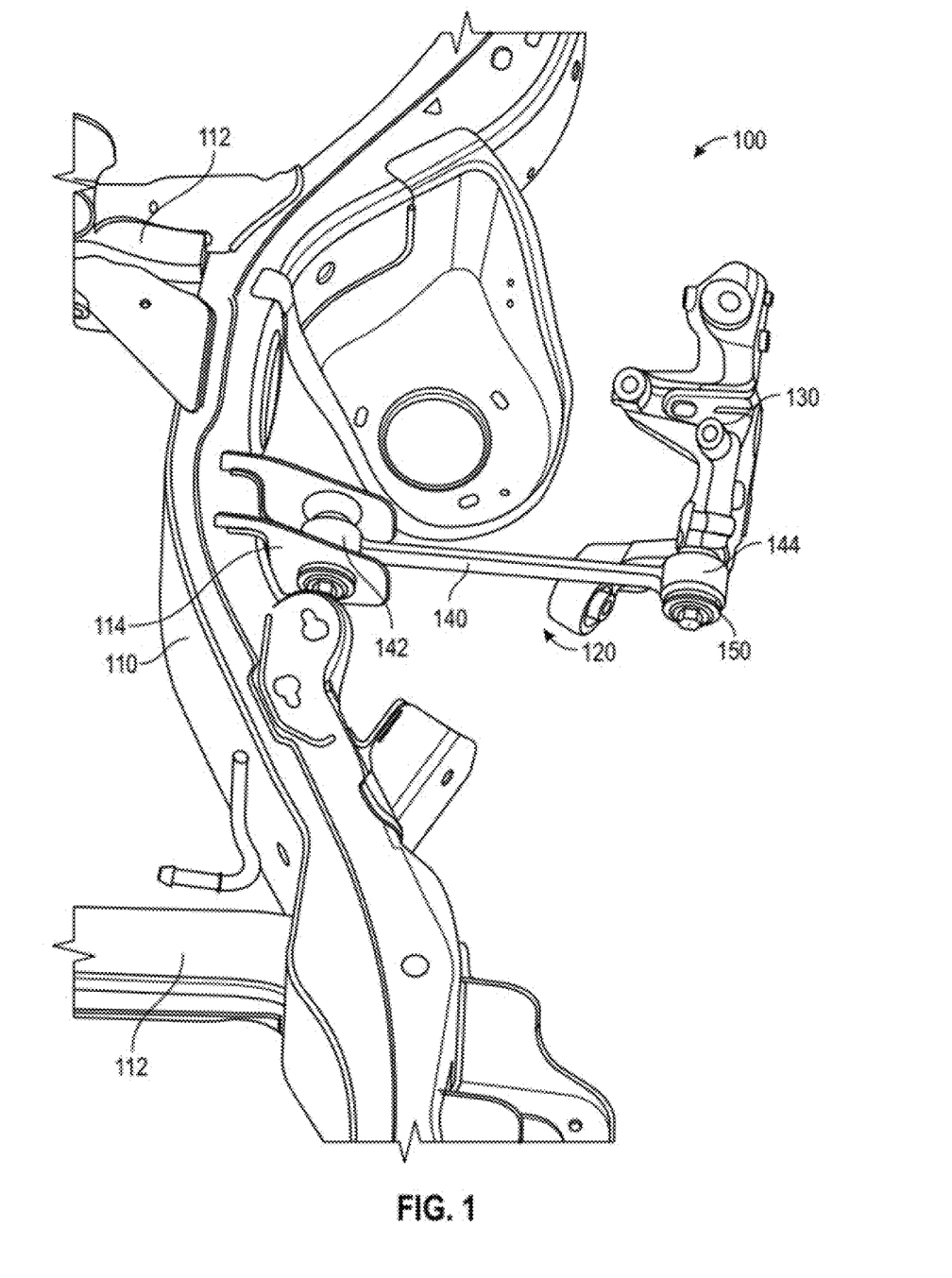
FIG. 1 illustrates a block diagram of a perspective view of certain components of a suspension system of a vehicle in isolation in accordance with an example embodiment.

FIG. 1 is a perspective view (with may components stripped away to provide visibility) of a portion of a suspension system 100 of a vehicle in accordance with an example embodiment. The suspension system 100 may include a longitudinally extending frame member 110 on one side of the vehicle, and a corresponding symmetrically formed additional longitudinally extending frame member (not shown) on the opposite side of a longitudinal centerline of the vehicle. One or more transverse frame members 112 may extend between the longitudinally extending frame members to define at least a portion of a frame of the vehicle.

A suspension link 120 in accordance with an example embodiment may be provided between the longitudinally extending frame member 110 and a knuckle 130 (e.g., for front or rear wheels). More particularly, a clevis joint may be formed between the suspension link 120 and the longitudinally extending frame member 110 (via clevis 114) at one end of the suspension link 120, and a cantilevered joint may be formed between the suspension link 120 and the knuckle 130 at the other end of the suspension link 120.

Figure 2:
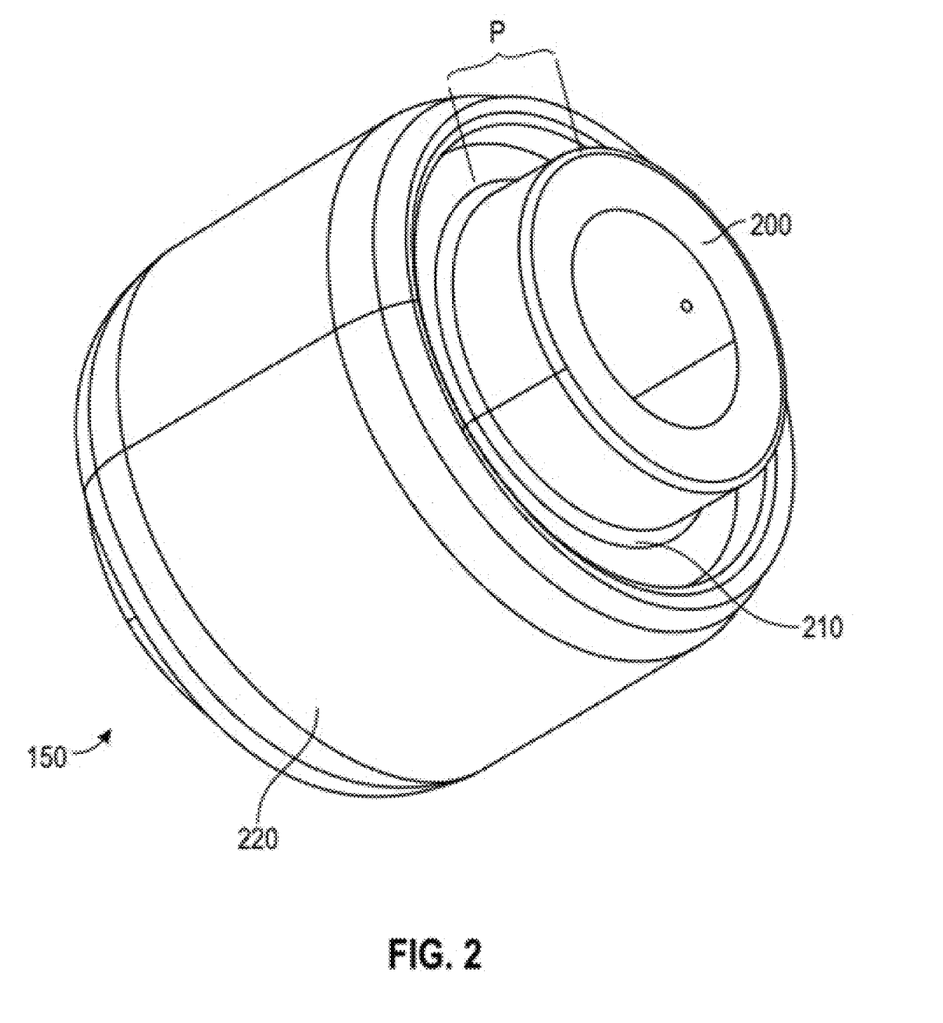
FIG. 2 illustrates a perspective view of a bushing in accordance with an example embodiment.

The suspension link 120 may be formed from a rod 140 having a first ring 142 at a first end of the rod 140, and a second ring 144 at a second end of the rod 140. Both the first and second rings 142 and 144 may be operably coupled to the longitudinally extending frame member 110 and the knuckle 130, respectively, via a bushing 150. On the side of the rod 140 with the first ring 142, a fastener assembly that may include a fastener (e.g., a bolt and nut) may pass through the bushing 150 to attach the bushing 150 to the clevis 114. In this regard, for example, the fastener assembly may pass through the clevis 114 and be affixed thereto. On the side of the rod 140 with the second ring 144, a different fastener assembly may be used to attach the second ring 144, with the bushing 150 therein, to the knuckle 130. However, the suspension link 120 may further incorporate a coupling assembly as further described hereinafter. Before describing the coupling assembly, however, it may be beneficial to appreciate the structural context in which the coupling assembly is employed in more detail. FIG. 2 provides some such context.

In this regard, FIG. 2 illustrates a perspective view of one instance of the bushing 150 in accordance with an example embodiment. The bushing 150 may be the same used within the first ring 142 and the second ring 144. However, in some cases, the bushing 150 that is employed with the second ring 144 may be different, or modified, by including the coupling assembly described below. The bushing 150 may include an inner metal portion 200, which may be surrounded on lateral sides by a rubber portion 210 (e.g., rubber, silicone, thermoplastic elastomers, polyurethane, neoprene, vinyl, nitrile, etc.), which may in turn be surrounded on lateral sides by an outer metal portion 220. The rubber portion 210 may, in some cases, substantially cover all lateral sides of the inner metal portion 200, but further have an exposed portion (P) that may be longer than the outer metal portion 220 in an axial direction.

The formation and internal coupling of these portions of the bushing 150 is outside the scope of this disclosure. The important part, for purposes of this disclosure, is that a coupling assembly may be used to operably couple the bushing 150 to the knuckle 130 of FIG. 1 (e.g., via the cantilever joint), and that the ordering and/or orienting of the components of the cantilever joint may be impossible to get backwards or wrong based on the structure of the coupling assembly.

As an initial matter, slip capacity of the joint formed between the suspension link 120 and the knuckle 130 may be a desirable feature. In order to enhance the slip capacity of this joint, it may be possible to, for example, provide serrations on a ferrule of the bushing 150 (as will be described in greater detail below). However, if the bushing 150 is designed to be symmetrical so that its orientation cannot be backward or wrong, serrations would be facing away from the bushing 150 in opposite directions. Meanwhile, the serrations can only work if the adjacent component that they would otherwise be intended to embed with are amenable to engagement with the serrations. The knuckle 130 is typically made of material that is amenable to engagement with the serrations. However, on the other side of the joint formed by the bushing 150, the serrations would normally end up adjacent to a washer, as we will see below. That washer normally has a very high hardness value, which is not amenable to engagement with serrations. Moreover, to the contrary, the serrations would tend to define a gap, and a reduction in the engagement surface area between the bushing 150 and the washer. This challenge must be met, and example embodiments do so by providing for a reduction in the hardness of the washer to below 200 HV (i.e., Vickers Hardness), as will be seen in the further discussion below in reference to FIG. 3 and following.

Figure 3:
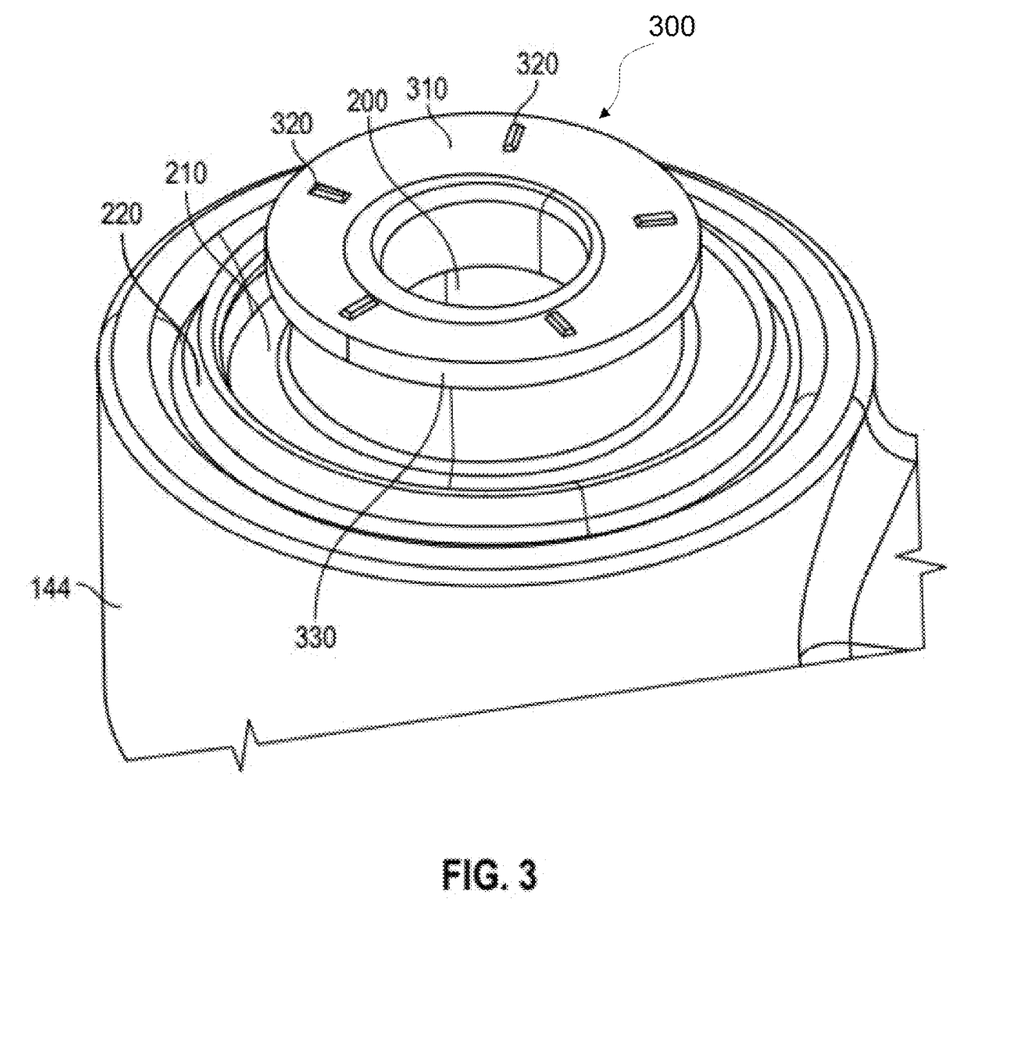
FIG. 3 illustrates a perspective view of a portion of a coupling assembly with a serrated bushing embedment of an example embodiment.

Before turning to FIG. 3, it may be appreciated that the bushing 150 of FIG. 2 may typically have a washer provided on each opposing side thereof, and the washer may be pressed against the inner metal portion 200 and/or the rubber portion 210 of the bushing 150. In some cases, another (larger) washer may be provided between one of those washers that sit proximate to the bushing 150 and this other (larger) washer may have a diameter that is larger than a diameter of the link eye (or hole) of the ring (e.g., the first or second ring 142 or 144). The other (larger) washer may be proximate a head of the bolt or fastener that is passed through the inner metal portion 200 to engage the knuckle 130.

In order to keep the cantilever joint slip capacity, it may be desirable to employ a serrated washer between the bushing 150 and the knuckle 130 on the one side of the bushing 150, but not possible to do so on the other side since the other (larger) washer typically has a high yield, high tensile strength construction with a hardness that may range from about 300-390 HV. The orientation of the serrations, and making sure they face the right way may therefore be necessary to attempt to manage with greater accuracy. If the serrations should end up facing the other (larger) washer, the serrations may actually decrease the contact area with the other (larger) washer since the other (larger) washer has such high hardness, and a gap may be created between these components reducing the tightness of the joint.

Nevertheless, there is the continued effort to reduce complexity and part count, while simplifying assembly. Accordingly, example embodiments may provide for integration of serrations on a ferrule of the bushing 150, and such serrations may be embedded to a ferrule placed on both opposing ends of the bushing 150. The serrations may be able to embed into the knuckle 130 to make the joint tight. However, the serrations oriented toward the other (larger) washer may normally not be able to embed into the other (larger) washer due to the excessive hardness of the other (larger) washer. Thus, example embodiments may further provide that the other (larger) washer have a hardness limit applied thereto that permits the serrations to engage effectively with the other (larger) washer.

Turning now to FIG. 3, the bushing 150 may be provided with a coupling assembly 300 that may be mirrored on both axial ends of the bushing 150. In this regard, the coupling assembly 300 on each axial end of the bushing 150 may be defined by a serrated face 310 defining a washer-like component that has serrations 320 dispersed over the serrated face 310. In this example, there are five serrations 320 provided, and they are spaced apart at regular intervals and extend radially outward from a central axis of the bushing 150 (substantially aligning a passage through the serrated face 310 with a channel that passes through the inner metal portion 200 along its axis). However, different numbers of serrations and different positioning or orientations, including asymmetric/non-regular intervals, may be employed in other example embodiments.

The serrated face 310 may, in some cases, be disposed at a washer-like metallic plate that is formed as a bushing ferrule 330 operably coupled to, or otherwise extended from, the inner metal portion 200 of the bushing 150. Thus, for example, the serrated face 310 (and bushing ferrule 330 on which it is located) may be integrally formed with the inner metal portion 200. However, it may be possible for the serrated face 310 to be provided on a separate washer component in some embodiments.

Figure 4:
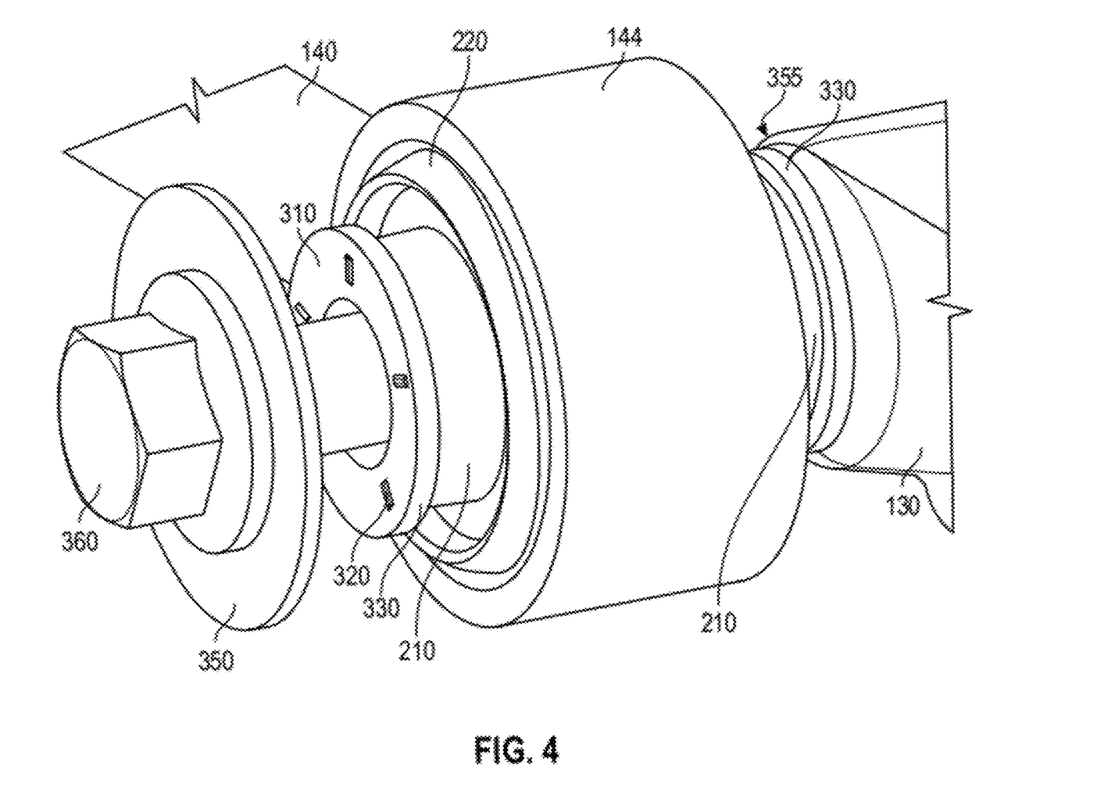
FIG. 4 illustrates a fastener connecting the bushing and coupling assembly to a knuckle prior to tightening in accordance with an example embodiment.

The coupling assembly 300 may also include a substantially mirrored instance of the bushing ferrule 330 on the opposite axial end of the bushing 150. Both instances of the bushing ferrule 330 may have serrations 320 embedded on outwardly (relative to the inner metal portion 200) oriented faces thereof to define respective instances of the serrated face 310. The serrated face 310 on each opposite side of the bushing 150 may be interchangeably installed within the link eye of the second ring 144. In other words, the direction of installation of the coupling assembly 300 and the bushing 150 may not matter. Both axial ends of the bushing 150 may present respective outwardly facing instances of the serrated face 310. On one side, the serrated face 310 may engage knuckle 130 when bushing is installed with the serrated face 310 oriented toward the knuckle 130. On the other side, the serrated face 310 may engage a hardness-limited washer 350 as shown in FIG. 4. As further shown in FIG. 4, a diameter of the serrated face 310 (and therefore also of the bushing ferrule 330) may be about equal to a size of the contact portion or contact pad 355 of the knuckle 130, which may be shaped to interface with the bushing ferrule 330.

Referring to FIG. 4, the suspension link 120 may be operably coupled to the knuckle 130 via a fastener 360. The fastener 360 may pass through the channel that extends along an axis of the inner metal portion 200 to engage the knuckle 130 (e.g., via threaded engagement), and may be tightened to a desired torque level. In an example embodiment, the fastener 360 may be disposed proximate to the hardness-limited washer 350, which is in turn disposed proximate to the bushing ferrule 330 on its corresponding side. The hardness-limited washer 350 may have a diameter that is larger than a diameter of the bushing ferrule 330. In particular, the hardness-limited washer 350 may have a diameter that is larger than the link eye of the second ring 144, to prevent any possibility of the head of the fastener 360 and the hardness-limited washer 350 from passing through the link eye. The bushing ferrule 330 may contact or extend from the inner metal portion 200 of the bushing 150 and be disposed directly between the inner metal portion 200 and the hardness-limited washer 350.

Tightness of this joint is desirable, as noted above. Therefore, the serrated face 310 may engage the knuckle 130 to prevent slippage of the joint on one side. Meanwhile, the maximum hardness of the hardness-limited washer 350 may be 200 HV. However, in some cases, a hardness within a range between 100 to 200 HV may be selected. This range of hardness values for the hardness-limited washer 350 may ensure that the serrations 320 on the serrated face 310 oriented toward the hardness-limited washer 350 may embed into the surface of the hardness-limited washer 350 to also increase the tightness of this joint.

Figure 5:
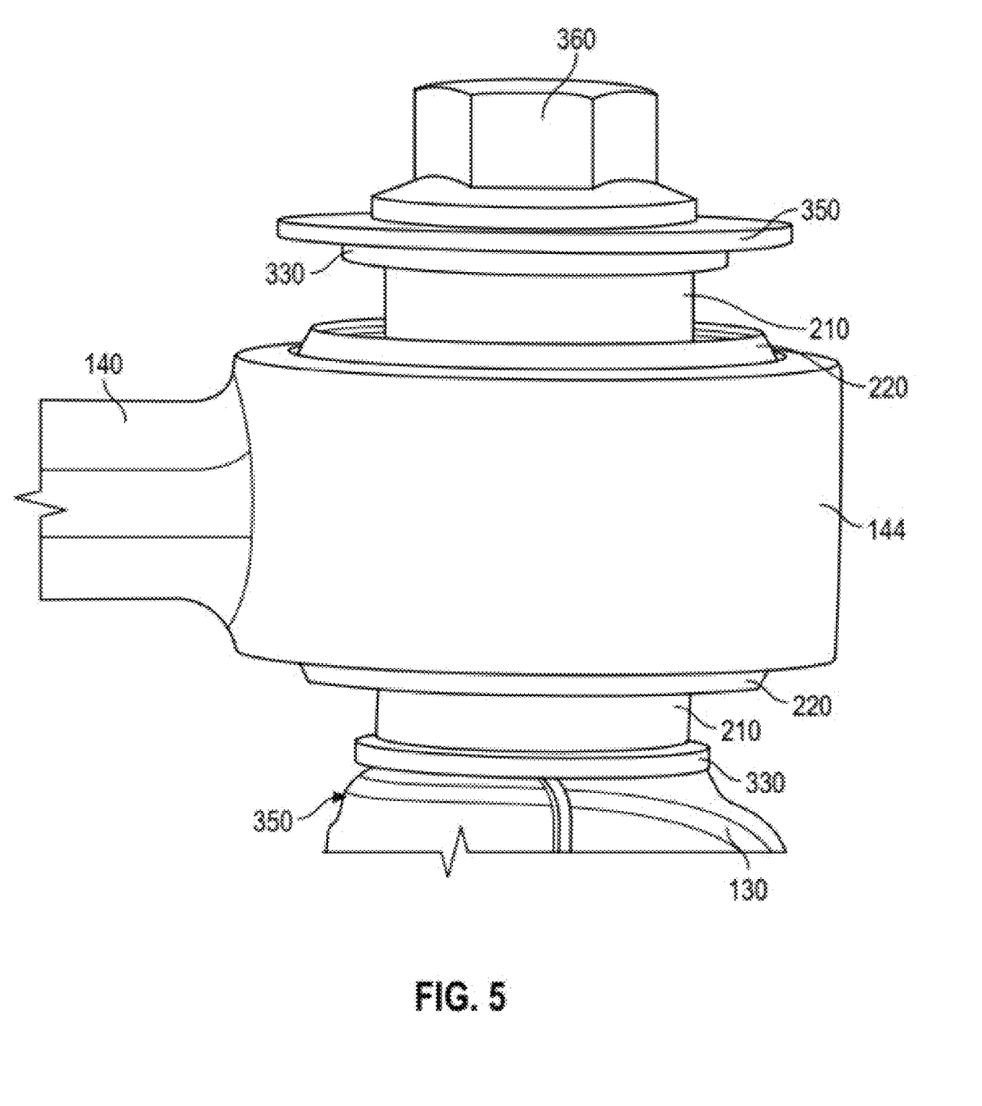
FIG. 5 illustrates the fastener connecting the bushing and coupling assembly to a knuckle after tightening in accordance with an example embodiment.

FIG. 4 shows the second ring 144 prior to tightening of the fastener 360 to demonstrate the orientation of the serrated face 310 relative to the hardness-limited washer 350. The serrations 320 of the serrated face 310 will be enabled to bite into the hardness-limited washer 350 to prevent leaving any gap between the hardness-limited washer 350 and the serrated face 310, and will better the tightness of the joint when the fastener 360 is tightened to the position shown in FIG. 5.

A vehicle suspension link for upgraded vehicle suspension may therefore be provided. The vehicle suspension link may include a bushing, a knuckle, a link arm operably coupled to the knuckle via the bushing at a ring formed at one end of the link arm, and a coupling assembly comprising a first bushing ferrule on a first axial end of the bushing and a second bushing ferrule on a second axial end of the bushing. Each of the first and second bushing ferrules may include a serrated face disposed to face away from the bushing, the serrated face comprising serrations embedded therein.

The suspension link (or a suspension system including such link) of some embodiments may include additional features, modifications, augmentations and/or the like to achieve further objectives or enhance performance of the assembly. The additional features, modifications, augmentations and/or the like may be added in any combination with each other. Below is a list of various additional features, modifications, and augmentations that can each be added individually or in any combination with each other. For example, the vehicle suspension link may further include a fastener disposed to extend from a head portion on a side of the link arm opposite the knuckle into the knuckle. A hardness-limited washer may be disposed between the head portion of the fastener the bushing ferrule, and a hardness of the hardness-limited washer may be less than about 200 HV. In an example embodiment, the ring defines a link eye into which the bushing is provided and through which the fastener passes to engage the knuckle, and a diameter of the hardness-limited washer may be larger than a diameter of the link eye. In some cases, the hardness of the hardness-limited washer may be between about 100 HV and about 200 HV. In an example embodiment, the first and second bushing ferrules may be disposed to mirror each other on opposite axial ends of the bushing. In some cases, each of the first and second bushing ferrules may be integrally formed with the bushing. In an example embodiment, the bushing may include an inner metal portion, a rubber portion disposed around lateral sides of the inner metal portion, and an outer metal portion disposed around lateral sides of the rubber portion. Each of the first and second bushing ferrules may be integrally formed with the inner metal portion. In some cases, the serrated face of the first bushing ferrule may engage the knuckle, and the serrated face of the second bushing ferrule may engage the hardness-limited washer. In an example embodiment, a diameter of the first bushing ferrule may be substantially equal to a size of a contact pad formed at the knuckle. In some cases, a diameter of the first and second bushing ferrules is less than a diameter of the hardness-limited washer.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle suspension link comprising:
   a bushing;
   a knuckle;
   a link arm operably coupled to the knuckle via the bushing at a ring formed at one end of the link arm; and
   a coupling assembly comprising a first bushing ferrule on a first axial end of the bushing and a second bushing ferrule on a second axial end of the bushing,
   wherein each of the first and second bushing ferrules comprises a serrated face disposed to face away from the bushing, the serrated face comprising serrations embedded therein,
   wherein a first outer diameter of the first and second bushing ferrules at the serrated face is larger than a second outer diameter of the first and second bushing ferrules at a remaining portion of the first and second bushing ferrules,
   wherein a hardness-limited washer is disposed between the head portion of a fastener the bushing ferrule, and
   wherein a hardness of the hardness-limited washer is between 100 HV and 200 HV.

2. The vehicle suspension link of claim 1, wherein the fastener is disposed to extend from a head portion on a side of the link arm opposite the knuckle into the knuckle.

3. The vehicle suspension link of claim 2, wherein the ring defines a link eye into which the bushing is provided and through which the fastener passes to engage the knuckle, and
   wherein a diameter of the hardness-limited washer is larger than a diameter of the link eye.

4. The vehicle suspension link of claim 2, wherein the first and second bushing ferrules are disposed to mirror each other on opposite axial ends of the bushing.

5. The vehicle suspension link of claim 2, wherein each of the first and second bushing ferrules is integrally formed with the bushing.

6. The vehicle suspension link of claim 2, wherein the bushing comprises an inner metal portion, a rubber portion disposed around lateral sides of the inner metal portion, and an outer metal portion disposed around lateral sides of the rubber portion, and
   wherein each of the first and second bushing ferrules is integrally formed with the inner metal portion.

7. The vehicle suspension link of claim 2, wherein the serrated face of the first bushing ferrule engages the knuckle, and the serrated face of the second bushing ferrule engages the hardness-limited washer.

8. The vehicle suspension link of claim 7, wherein a diameter of the first bushing ferrule is substantially equal to a size of a contact pad formed at the knuckle.

9. The vehicle suspension link of claim 2, wherein a diameter of the first and second bushing ferrules is less than a diameter of the hardness-limited washer.

10. A vehicle suspension system comprising:
    a frame comprising one or more lateral or longitudinal frame members;
    a knuckle operably coupled to the frame; and
    a vehicle suspension link operably coupling the knuckle to the frame, wherein the vehicle suspension link comprises:
    a bushing;
    a link arm operably coupled to the knuckle via the bushing at a ring formed at one end of the link arm; and
    a coupling assembly comprising a first bushing ferrule on a first axial end of the bushing and a second bushing ferrule on a second axial end of the bushing,
    wherein each of the first and second bushing ferrules comprises a serrated face disposed to face away from the bushing, the serrated face comprising serrations embedded therein,
    wherein a first outer diameter of the first and second bushing ferrules at the serrated face is larger than a second outer diameter of the first and second bushing ferrules at a remaining portion of the first and second bushing ferrules,
    wherein a hardness-limited washer is disposed between the head portion of a fastener the bushing ferrule, and
    wherein a hardness of the hardness-limited washer is between 100 HV and 200 HV.

11. The vehicle suspension system of claim 10, wherein the fastener is disposed to extend from a head portion on a side of the link arm opposite the knuckle into the knuckle.

12. The vehicle suspension system of claim 11, wherein the ring defines a link eye into which the bushing is provided and through which the fastener passes to engage the knuckle, and
    wherein a diameter of the hardness-limited washer is larger than a diameter of the link eye.

13. The vehicle suspension system of claim 11, wherein the first and second bushing ferrules are disposed to mirror each other on opposite axial ends of the bushing.

14. The vehicle suspension system of claim 11, wherein each of the first and second bushing ferrules is integrally formed with the bushing.

15. The vehicle suspension system of claim 11, wherein the bushing comprises an inner metal portion, a rubber portion disposed around lateral sides of the inner metal portion, and an outer metal portion disposed around lateral sides of the rubber portion, and
    wherein each of the first and second bushing ferrules is integrally formed with the inner metal portion.

16. The vehicle suspension system of claim 11, wherein the serrated face of the first bushing ferrule engages the knuckle, and the serrated face of the second bushing ferrule engages the hardness-limited washer.

17. The vehicle suspension system of claim 16, wherein a diameter of the first bushing ferrule is substantially equal to a size of a contact pad formed at the knuckle.

18. The vehicle suspension system of claim 11, wherein a diameter of the first and second bushing ferrules is less than a diameter of the hardness-limited washer.

* * * * *